(12) United States Patent
Lim et al.

(10) Patent No.: US 8,669,842 B2
(45) Date of Patent: Mar. 11, 2014

(54) APPARATUS AND METHOD FOR CONTROLLING CONTENTS PLAYER

(75) Inventors: Jeong-Mook Lim, Daejeon (KR); Dong-Woo Lee, Daejeon (KR); Yong-Ki Son, Daejeon (KR); Bae-Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 561 days.

(21) Appl. No.: 12/944,524

(22) Filed: Nov. 11, 2010

(65) Prior Publication Data

US 2011/0148568 A1 Jun. 23, 2011

(30) Foreign Application Priority Data

Dec. 18, 2009 (KR) .................. 10-2009-0126706
Apr. 15, 2010 (KR) .................. 10-2010-0034535

(51) Int. Cl.
*G05B 19/02* (2006.01)

(52) U.S. Cl.
USPC ........... 340/4.31; 84/737; 341/21; 340/407.1; 340/573.1

(58) Field of Classification Search
USPC ............. 340/4.11, 4.12, 4.13, 4.14, 4.3, 4.31, 340/12.21, 12.22, 12.23, 12.24, 562, 407.1, 340/540; 341/21; 600/587, 437, 499
See application file for complete search history.

(56) References Cited

U.S. PATENT DOCUMENTS

| 2002/0126014 | A1 | 9/2002 | Nishitani et al. | |
| 2003/0230186 | A1 | 12/2003 | Ishida et al. | |
| 2005/0126370 | A1 | 6/2005 | Takai et al. | |
| 2005/0148870 | A1* | 7/2005 | Dryselius et al. | 600/437 |
| 2005/0253712 | A1* | 11/2005 | Kimura et al. | 340/562 |
| 2006/0263175 | A1 | 11/2006 | Yaeger | |
| 2007/0073122 | A1* | 3/2007 | Hoarau | 600/323 |

FOREIGN PATENT DOCUMENTS

| JP | 2002-251186 | 9/2002 |
| JP | 2004-20748 | 1/2004 |
| JP | 2005-270546 | 10/2005 |
| KR | 10-2005-0049345 | 5/2005 |
| KR | 10-0561245 | 3/2006 |
| KR | 10-0598622 | 7/2006 |
| KR | 10-0793834 | 1/2008 |

* cited by examiner

*Primary Examiner* — Nabil Syed
(74) *Attorney, Agent, or Firm* — Nelson Mullins Riley & Scarborough LLP; Anthony A. Laurentano, Esq.; John S. Curran, Esq.

(57) ABSTRACT

Provided is a technology for controlling a contents player based on a grasping power information of a hand by measuring a change of the bundle shape of a tendons in an inside muscle of wrist, in which the device and method for controlling the contents player comprises a sensing unit that generates a grasping power information; a control state managing unit that manages a control state of the contents player; and a control order generating unit that generates a control order controlling the contents player based on the control state and the grasping power information, and transmits the control order, in which the control state can be changed or can be generates in response to the grasping power information, and the sensing unit can be existed in both hands, respectively.

14 Claims, 6 Drawing Sheets

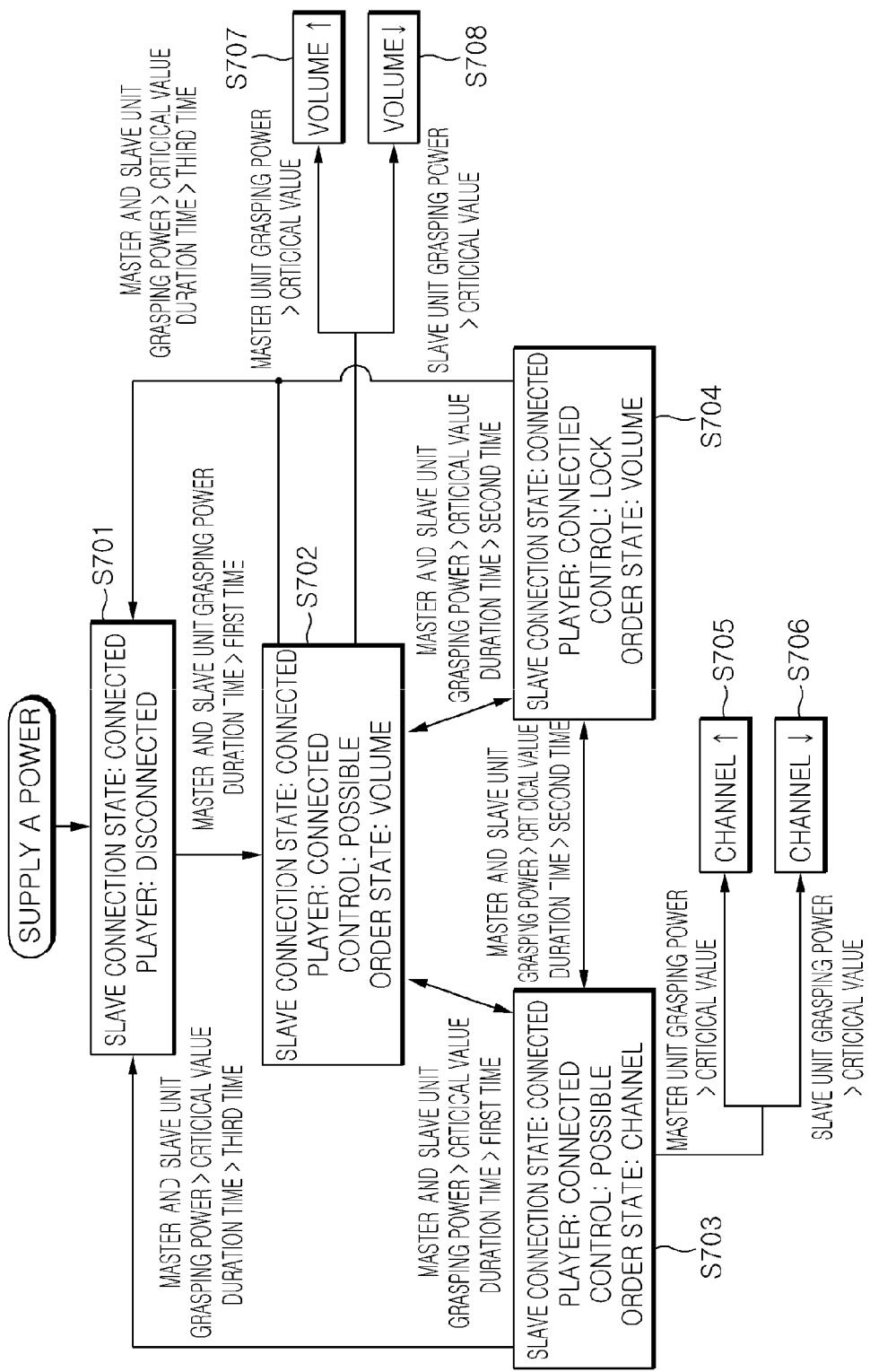

APPARATUS AND METHOD FOR CONTROLLING CONTENTS PLAYER

CROSS REFERENCE TO RELATED APPLICATIONS

This application claims priority to Korean Patent Application No. 10-2009-0126706 filed on Dec. 18, 2009 and Korean Patent Application No. 10-2010-0034535 filed on Apr. 15, 2010, the entire contents of which are herein incorporated by reference.

BACKGROUND OF THE INVENTION

1. Field of the Invention

The present invention relates to a technology for controlling a contents player, and more particularly, to a technology for controlling a contents player by using the motion of a grasping power. Specifically, the present invention is the technology for controlling up or down of the channel and volume of the contents player by using the change in the grasping power of both hands as a model of a controller.

2. Description of the Related Art

While a technology for a contents player is studied, a research for the control technology of a contents player has been actively conducted. In particular, there is a growing need to introduce a device that can conveniently assist in the control of the operation by the user without directly accessing the contents player.

The technology for controlling the contents player includes a control button input means disposed in a player or accessories, such as ears phone, or the means of using a wireless remote controller, and the like. However, for the means as mentioned above, it is inconvenient to input a control order by using a hand action with seeing the direct control button or controller by the user.

Specifically, a movement of user's eyes or an action of grasping a device can be a natural behavior in general. However, if a user is in a situation when it is difficult for a user to control accessories or move user's eye, such as driving, working out and the like, such that issues that threaten user safety, or cause unnatural actions occur.

Therefore, there is a growing a need to technology for user's convenience for controlling the contents player, and developing a technology in response to the above has been actively performed.

For example, there is a method for controlling player by recognizing a gesture, a brainwave, or a voice. However, the gesture, the brainwave, or the voice sensitively reacts according to a sensor attachment location, user's mental state, and neighborhood noise, such that accuracy in controlling can be reduced. In addition, because in the case of the gesture or the brainwave, a special device for sensing the gesture or the brainwave should be installed in body parts such as in a user's hair or in front of the face, and the like, there is a problem in that user may feel uncomfortable when the user is driving or exercising.

Therefore, a need for a technology to control accurately the contents player using a further device, in which user may not feel uncomfortable by wearing the device is growing.

SUMMARY OF THE INVENTION

An object of the present invention is to provide a technology that can control a contents player regardless of the sudden change of body state for user or a surrounding environment. In addition, another object of the present invention is to provide a technology that can conveniently and precisely control a contents player even if a user is doing other work in response to body movement of the user without a control button or remote controller as a input mean.

An exemplary embodiment of the present invention provides a device for controlling a contents player, comprising: a sensing unit that measures a change of a bundle shape of tendons of a muscle inside of user's wrist, and generates a grasping power information; a control state managing unit that manages a control state of the contents player in response to the grasping power information; and a control order generating unit that generates a control order controlling the contents player based on the control state and the grasping power information, and transmits the control order.

The sensing unit comprises a first sensing unit of a master unit wrist and a second sensing unit of a slave unit wrist installed on both wrists.

The control state managing unit can convert the control state based on the duration time in which the grasping power of the master unit and the slave unit wrists exceeds the ctritical value at the same time. In addition, the control order generating unit generates different control order according to the case, in which the grasping power of one wrist between the master unit and the slave unit exceeds the threshold value.

The control order generating unit generates the control order that turns up one of the channel or volume of the contents player when the grasping power of the wrist of the master unit exceeds the threshold value. On the contrary, the control order generating unit generates the control order that turns down one of the channel or volume of the contents player when the grasping power of the wrist of the slave unit exceeds the threshold value.

The control state according to the present invention includes at least one of a connection state indicating whether the contents player and the controller is connected or not, a control possibility state indicating whether the contents player is controllable or not based on the control order, and a control order state for selecting between the channel and volume controls.

Responsing control possibility state, the control order generating unit transmits the control order only when the control possibility state is in possible state. On the contrary, when the control possibility state is in locked state, the transmission of the control order can be blocked regardless of the information of the sensing unit.

In addition, the sensing unit can improve the accuracy in the transmission of the control signal by producing the grasping power information only when the grasping power of the wrist exceeds the threshold value. The sensing unit can comprise components for measuring the change in the bundle of the tendons of both wrists.

The configuration of the sensing unit comprises a transmitting unit that irradiates a light signal on the skin tissue of the wrists; and a receiving unit measuring the intensity of radiation which is an amount of the light signal from transmitting unit reflected by the inside tissue of the wrist.

An embodiment of the present invention provides a method for controlling a contents player, comprising: generating a grasping power information by measuring a shape change of a bundle of tendons of a muscle inside of the wrist by a sensing unit; managing a control state of the contents player in response to the grasping power information by the control state managing unit; and generating the control order, which controls the contents player based on the control state and the grasping power information and transmitting the control order by the control order producing unit.

A method for controlling the contents player according to the exemplary embodiment of the present invention, generating the grasping power information is generating the grasping power information in both wrists by a first sensing unit of a master unit wrist and a second sensing unit of a slave unit wrist installed on both wrists, respectively.

Other features and configuration of the present invention are the same with the device for controlling the contents player according to the embodiments of the present invention.

According to the embodiments of the present invention, it is to provide a device for effectively controlling the basic function of the contents player by only giving a force on the wrists without separately requiring the control of special devices and the movement of eyes to the direct control button or remote controller by a user. In addition, because the grasping power is measured by using the change in the bundle of tendons of the wrists, the control order for the contents player can be produced; as a result, there is an effect that the user can precisely control the contents player without needing to sharply change the body or the surrounding environments.

BRIEF DESCRIPTION OF THE DRAWINGS

FIG. 7 is a block diagram of an example of a method for controlling a contents player according to an embodiment of the present invention.

DETAILED DESCRIPTION OF THE PREFERRED EMBODIMENTS

Hereinafter, a device and a method for controlling a contents player according to the embodiments of the present invention will be described in more detail with reference to the appended drawings.

Figure 1:
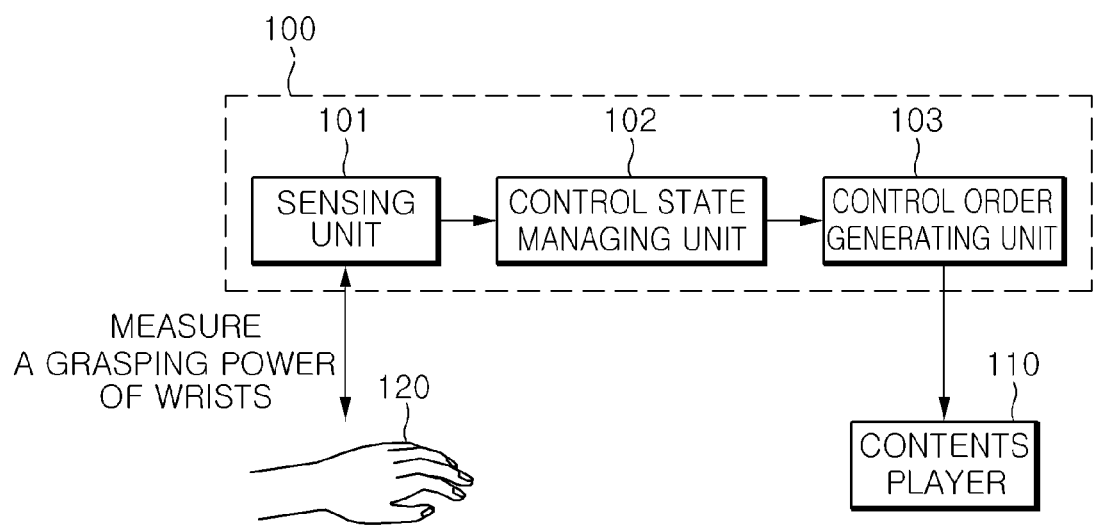
FIG. 1 is a block diagram of an apparatus for controlling a contents player according to a first embodiment of the present invention.

FIG. 1 is a device diagram for controlling a contents player according to a first embodiment of the present invention.

Referring to FIG. 1, the device 100 for controlling the contents player according to the first embodiment of the present invention comprises a sensing unit 101, a control state managing unit 102, and a control order generating unit 103. The control order generating unit 103 is connected with a contents player 110 and transmits a control order to the contents player 110.

The sensing unit 101 generates a grasping power information by measuring a change in a shape of a bundle of tendons in a muscle inside of a wrist. The muscle inside of the wrist is changed by the power needed for gripping a hand. In other words, the shape of the bundle of the tendons is changed by the change of the grasping power, which is the power for gripping the hand, and the sensing unit 101 measures the grasping power, which is a power for gripping the hand by measuring the change of the shape of the bundle of the tendons.

Therefore, the sensing unit 101 according to the first embodiment of the present invention may have a function for measuring the change in the shape of the bundle of the tendons of the inside muscle of wrist. In addition, the sensing unit 101 may have a function for generating the grasping power information based on the grasping power strength and the change of the shape of the bundle of the tendons of the muscle inside of the wrist. In general, the sensing unit 101 may calculate the grasping power information of the wrist linearly.

The sensing unit 101 should measure the change of the shape of the bundle of the tendons. The sensing unit 101 according to the first embodiment of the present invention may be a sensor for sensing a light signal such as an infrared sensor in order to measure the change of the shape of the bundle of the tendons.

More specifically, the sensing unit 101 comprises a receiving unit for measuring the intensity of radiation, in which the light signal is reflected by the inside tissue of the wrist, and a transmitting unit that allows the skin tissue of the wrist to reflect the light signal.

When gripping a hand, the physical shape under the wrist (specifically, the shape of the bundle of the tendons) is changed, and the grasping power, which is the power for gripping the hand, can be measured because the intensity of radiation of the light signal from the transmitting unit is reflected variously and linearly according to the change of the shape of the bundle of the tendons.

The light signal from the transmitting unit is reflected or absorbed by the surrounding tissue including the skin surface, a bone of the inside wrist, a muscle, or blood. the receiving unit disposed in the surrounding area of the transmitting unit can measure the intensity of radiation reflected by the surrounding tissue as mentioned above. The receiving unit shows the change in the intensity of light, that is charted, after an amplification of the light signal for accurate measurement.

The sensing unit 101 calculates the change of the grasping power according to the change of the intensity of radiation when the change in the intensity of radiation is charted. The sensing unit 101 generates a grasping power information by using a stored expression.

The sensing unit 101 according to another embodiment of the present invention may be a power measuring sensor that can measure the grasping power directly, in addition to the sensor for measuring the change of the light signal that is reflected by the bundle of tendons. In addition, any sensor which can measure the change in the bundle of tendons of the inside muscle of the wrist can be used in the sensing unit 101.

The sensing unit 101 according to another embodiment of the present invention can generate the grasping power information only when the grasping power of the wrist exceeds a threshold value. The grasping power information according to the first embodiment of the present invention means a numerical value of all grasping power included in the linear graph charted in respects to the grasping power.

However, the sensing unit 101 according to another embodiment of the present invention may include the function for transmitting a signal to the control state managing unit 102 only when the grasping power exceeds a certain value. Therefore, in this case, the sensing unit 101 can transmit a signal to the control state managing unit 102 only when the measured grasping power exceeds a threshold value, and the signal transmitted to the control state managing unit 102 means a kind of binary signal which indicates whether the grasping power exceed a threshold value or not. and the grasping power information in this case means the transmitted signal as mentioned above.

The control state managing unit 102 manages control state of the contents player 110 in a response to the grasping power information.

The control state according to the first embodiment of the present invention includes a connection state indicating whether the contents player 110 and the controller 100 is connected or not. The controller 100 of the contents player 110 according to the embodiment of the present invention operates all functions of the controller 100 when a power is supplied.

Meanwhile, the contents player 110 can be in the state for operatable state when the power is supplied. However, in order to reflect the purpose of the user precisely, the connection between the controller 100 and the contents player 110 can be performed based on the grasping power information. For the control state in the first embodiment of the present invention in this case, the control state managing unit 102 can control the connection state by including the connection state.

The control state can include a control possibility state indicating whether the contents player is control label or not. The control possibility state can have the same meaning as a lock device used in mobile communication device or a general contents player. In other words, when the contents player can be controlled, the control order generated in the control order generating unit 103 based on the grasping power information can be transmitted to the contents player 110. Meanwhile, in the case of the control possibility state is in the lock state, the control order generated in the control order generating unit 103 cannot be transmitted to the contents player 110.

The control state can include a control order state, in which one of the channel or volume controls is selected. The control order state is used when genearting the order based on the measured grasping power in the sensing unit 101. Because there is a limit to controlling the contents player 110 closely by using the grasping power in side of order kinds, the way for diversifying kinds of orders by using the grasping power is selected.

For example, when initial control order state is set to the volume state, a control order turning up or down the volume based on the grasping power information is generated, and is then transmitted to the contents player 110. Meanwhile, when any grasping power information is inputted in the initial control order state, the control order state is converted to a channel state. Then, the control order turning up or down of the channel (or the selection of music) is generated based on a grasping power information, and is then transmitted to the contents player 110.

The control order generating unit 103 generates the control order for controlling the contents player 110 based on the grasping power information and the control state, and transmits the control order.

The grasping power information is transmitted to the control order generating unit 103 and the control state managing unit 102 at the same time. The control order generating unit 103 generates the control order for ordering turning up or down the channel or volume of the contents player 110 based on the grasping power information.

The order generated in the control order generating unit 103 should be selected as one of the channel and the volume, and then it should be determined whether or not the generated control order should be transmitted to the contents player 110, so that the control order generating unit 103 has a function for receiving the present control state of the contents player 110 from the control state managing unit 102.

Therefore, the control order generating unit 103 interprets the grasping power information based on the control state, and then the substantive control order is generated based on the interpreted grasping power information. The control state includes the control possibility state. Therefore, the control order generating unit 103 may transmit the control order only when the control possibility state is in the possible state. In other words, even if the control order is generated, the function transmitting the generated control order to the contents player 110 is managed according to the control state.

Figure 2:
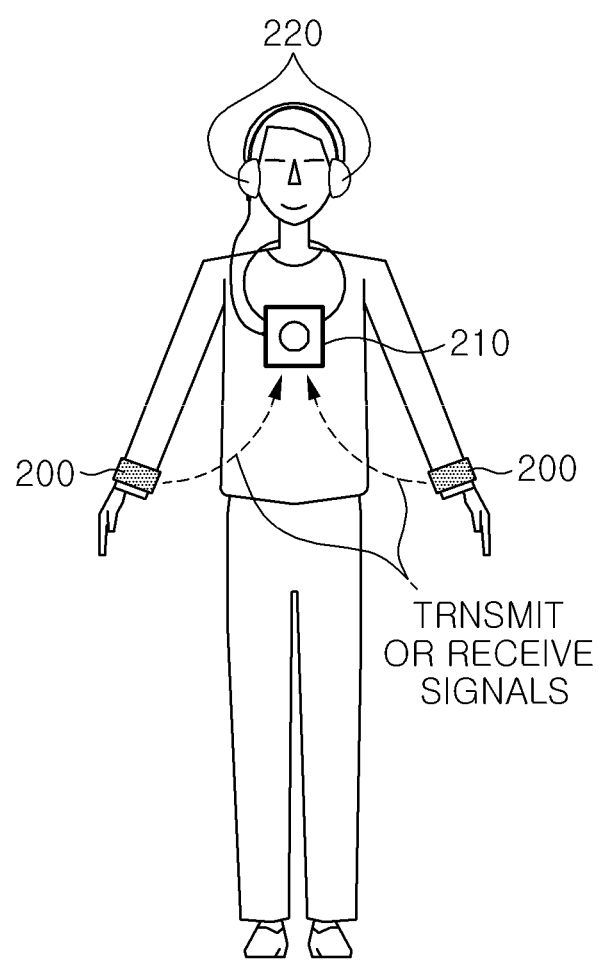
FIG. 2 illustrates an example of the appearance of a user using the present invenion.

FIG. 2 illustrates an example of the appearance of a user using the present invention.

Referring to FIG. 2, the user has a contents listening device, such as ears phone 220, and the contents player 210 can be installed on a part of body. In FIG. 2, the contents player 210 is exemplified as a necklace, such that it is designed for the user to conveniently carry it when user is driving or exercising.

The contents player 210 is connected to the controller 200 via a wire or wireless communication. For example, the control signal of the controller 200 can be transmitted to the contents player 210 through BlueTooth, RF module, an infrared short-distance communication, and the like. A plurality of controllers 200 can exist, thereby worn on both hands.

The controller 200 is located on the wrist of the user. In order to reduce the effect on the controller 200 by the user's movement, it can be designed that the controller 200 is coiled similar to a type of band around the wrist of a user. The user carries the controller 200 on the wrist, and the grasping power information is transmitted to the sensing unit in the controller 200 by applying the grasping power. The controller 200 analyzes the grasping power information and controls the contents player 210.

Figure 3:
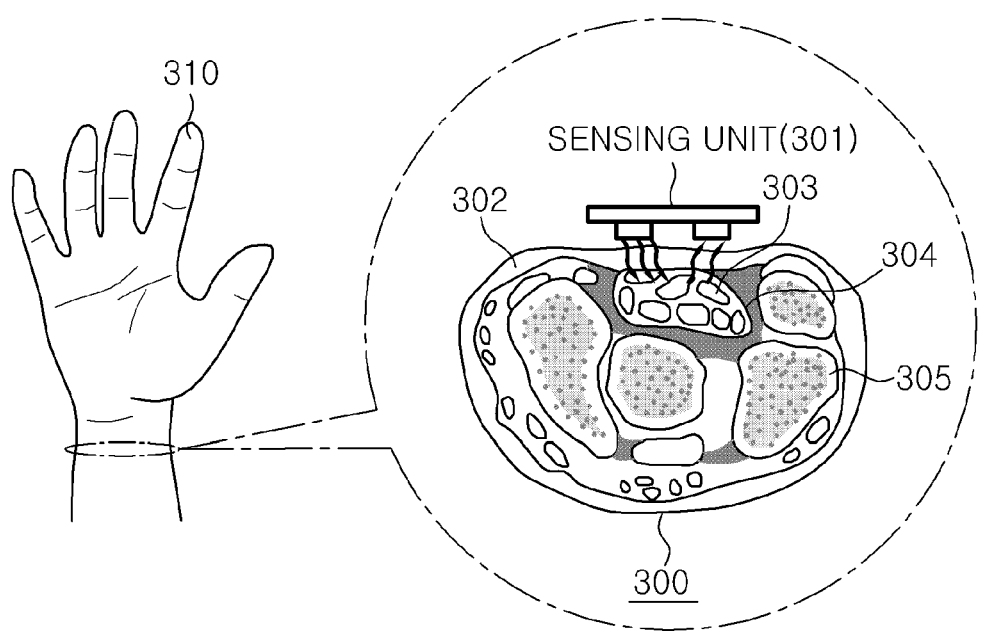
FIG. 3 illustrates an example of an operation of a sensing unit and a cross-section of wrist.

FIG. 3 illustrates an example of an operation of a sensing unit and a cross-section of the wrist.

Referring to FIG. 3, the sensing unit 301 can be located near a part of the wrist as the connection point between the hand 310 and arm. More preferably, the sensing unit 301 can be located near the part of the wrist on the side of the palm, in which the tendons 303 of the wrist are concentrated.

According to the cross-section of the wrist 300, generally, the human wrist consists of skin 302, tendons 303, a wrist tunnel 304 (carpal tunnel), and a bone 305.

The sensing unit 301 is disposed on the palm side of the wrist that the tendons 303 and the wrist tunnel 304 is gathered. The sensing unit 301 receives the incident and reflected light signal inside of the tissue of the wrist as depicted in FIG. 1. Based on the intensity of radiation received, the shape change of the bundle of tendons 303 is measured, and then calculated, so that the information about the user's grasping power is generated.

Figure 4:
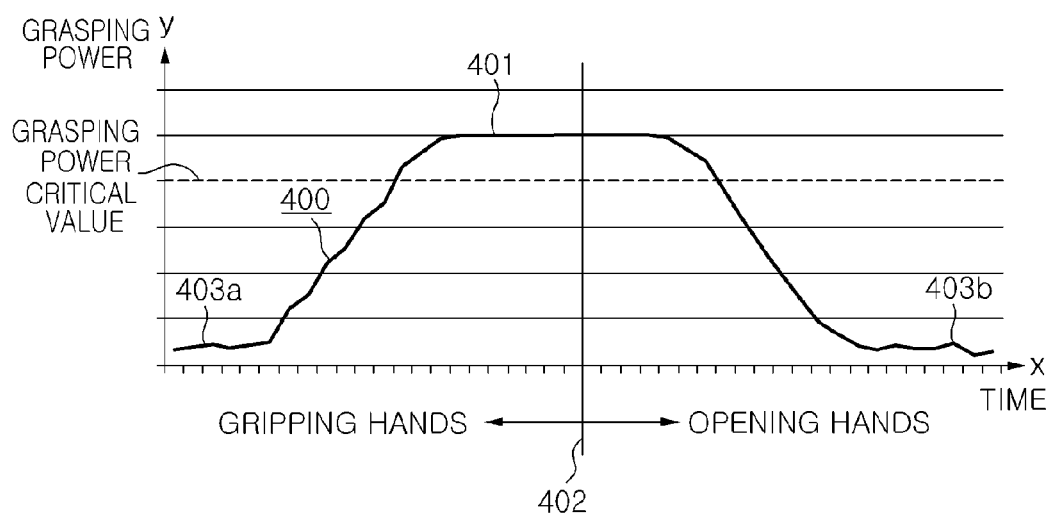
FIG. 4 illustrates an example of a grasping power information of wrist that is measured by a sensing unit.

FIG. 4 illustrates an example of a grasping power information of the wrist that is measured by a sensing unit.

If the sensing unit as showed in FIG. 3 measures the shape change of the bundle of the tendons, the sensing unit calculates the grasping power information from the shape change information of the bundle of tendons in reference to the expression.

The graph in FIG. 4 is a graph using a time-series analysis, and a flow that follows the actions of gripping and actions of opening the hands according to the time. In other words, the graph shows the measurement of the up and down of the grasping power.

Referring to FIG. 4, x-axis is time, and y-axis is the grasping power. The stable section from the initial part to the end part of the graph 403a and 403b means the initial part when no change of the bundle of the tendons of the wrist occur, that is, when the sensing unit cannot detect the grasping power.

Section 400 shows the increase of the grasping power strength. This section means that the grasping power is increased linearly through the actions of the gripping the hand of the user.

Meanwhile, the grasping power threshold value shown on the graph is a standard value that is required to generate the change of the control state and the control order. The control state managing unit can change the control state when the grasping power exceeds a plurality of times defined in the running time that is exceeded the threshold value. Therefore, in order to change the control state in the embodiment of the present invention, the time, in which the grasping power exceeds the threshold value, should be measured.

In addition, the control order generating unit generates the control order of turning up or down the channel or volume whenever the grasping power exceeds the threshold value. For another embodiment of the present invention, in the increasing section 400 of the grasping power strength, the linearly up or down of the channel or volume can be controlled by the grasping power. The threshold value of the grasping value may exist at the increasing section 400 of the grasping power strength linearly according to the embodiment of the present invention.

The section 401 in which the grasping power strength is converged on the basis of a constant value can exist. A certain value can be selected as any value based on the measured range of a sensor included in the sensing unit, and the amount of control needed in the controller.

The distinguish point 402 between the grasping by the hand and opening the hand may exist in the section 401 in which the grasping power strength converges on basis of a predetermined value. The distinguish point 402 may exist in any part of the section 401 in which the grasping power strength converges the constant value.

Figure 5:
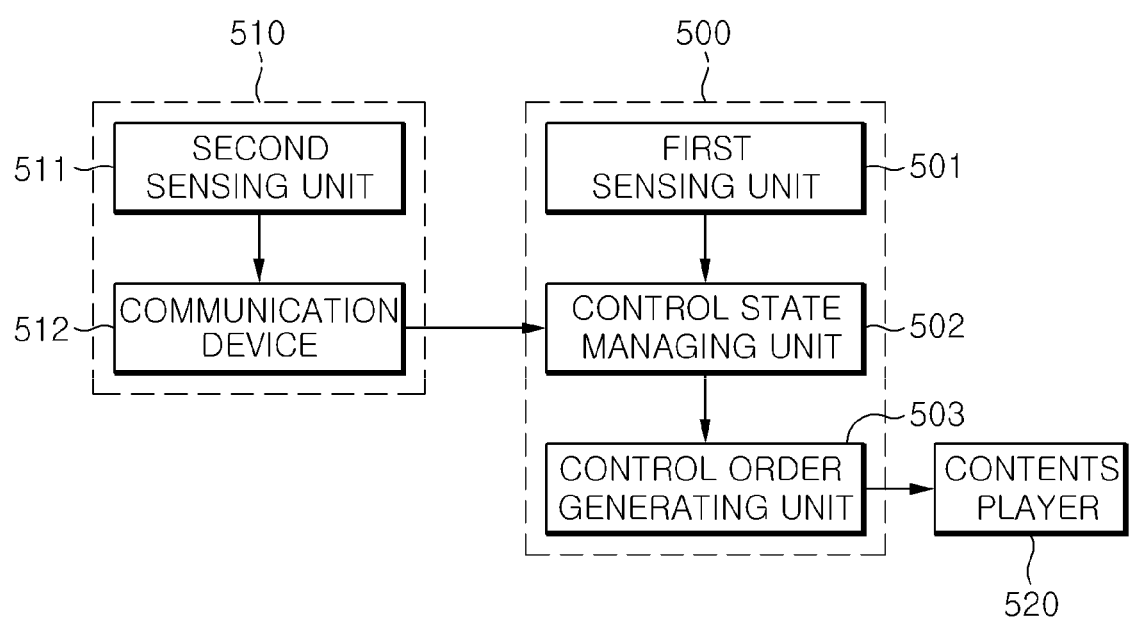
FIG. 5 is a block diagram of an apparatus for controlling a contents player according to a second embodiment of the present invention.

FIG. 5 is a device diagram of a device for controlling a contents player according to a second embodiment of the present invention. Hereinafter, the part that is overlapped with the description from the first embodiment of the present invention as depicted in FIG. 1 to FIG. 4 will be omitted.

The major feature in the second embodiment as compared with the first embodiment of the present invention is that there are two sensing units.

Referring to FIG. 5, there is a master unit 500 comprising the control state managing unit 502 and the control order generating unit 503, and transmitting the control order to the contents player 520 on one wrist. The sensor installed in the master unit 500 is called a first sensing unit 501. Meanwhile, there is a slave unit 510 that can be possibly installed on the other wrist, and the sensor installed in the slave unit 510 is called a second sensing unit 511.

The first sensing unit 501 and the second sensing unit 511 can exist on both wrists of the user respectively. Therefore, there is a configuration that the grasping power in both wrists of the user can be measured.

The control state managing unit 502 and the control order generating unit 503 according to the second embodiment of the present invention receives the order of the first sensing unit 501 and the second sensing unit 511, at the same time. a grasping power of the wrists in a response to the master unit 500 and the slave unit 510 are measured at the same time, and then generating the control state and the control order can be performed by combining the grasping power information in both wrists. Therefore, the control order generation can be simplified as compared with the first embodiment of the present invention, and types of control order may be various by combining the grasping power information from both wrists.

There is a communication device 512 for transmitting the grasping power information of the wrists on the side of the slave unit 510 measured by the second sensing unit 511 to the control state managing unit 502 in the master unit 500. The communication device 512 is a means that transmits the grasping power information of the slave unit 510, and it is possible to use if it is a any short-distance communication device including the infrared communication device.

The control state managing unit 502 and the control order generating unit 503 according to the second embodiment of the present invention can perform the functions as follows in order to use the grasping power information in both wrists.

Firstly, the control state managing unit 502 can have the function that converts the control state based on the duration time in which the grasping power in both wrists of the master unit 500 and the slave unit 510 exceeds the threshold value at the same time. Converting the control state is a major function when controlling the contents player 520, in order to convert the control state, the duration time of when the grasping power information of both wrists exceeds the threshold value at the same time is measured, and then the conversion order of the control state is generated based on the measured duration time.

In addition, the control order generating unit 503 can have a function that generate other control orders based on the case that the grasping power on one wrist among the master unit 500 or the slave unit 510 exceeds the threshold value.

The control order means that the channel or volume is turned up or down in the embodiment of the present invention. Therefore, the orders turning up or down of the channel or volume of the contents player 520 can be generated in different ways. Therefore, the control order in the second embodiment of the present invention should be generated only based on one grasping power information among the grasping power information of the master unit 500 or slave unit 510.

For example, whenever the grasping power of the wrist in the master unit 500 exceeds the threshold value, the order turning up the channel or volume of the contents player 520 can be generated. In this case, when the grasping power of the wrist in the slave unit 510 exceeds the threshold value, the down order of the channel or volume of the contents player 520 can be generated. For this reason, the control order can be generated, precisely and variously. Other movement according to the second embodiment of the present invention will be similarly described with the description of the first embodiment of the present invention as depicted in FIG. 1 to FIG. 4.

Figure 6:
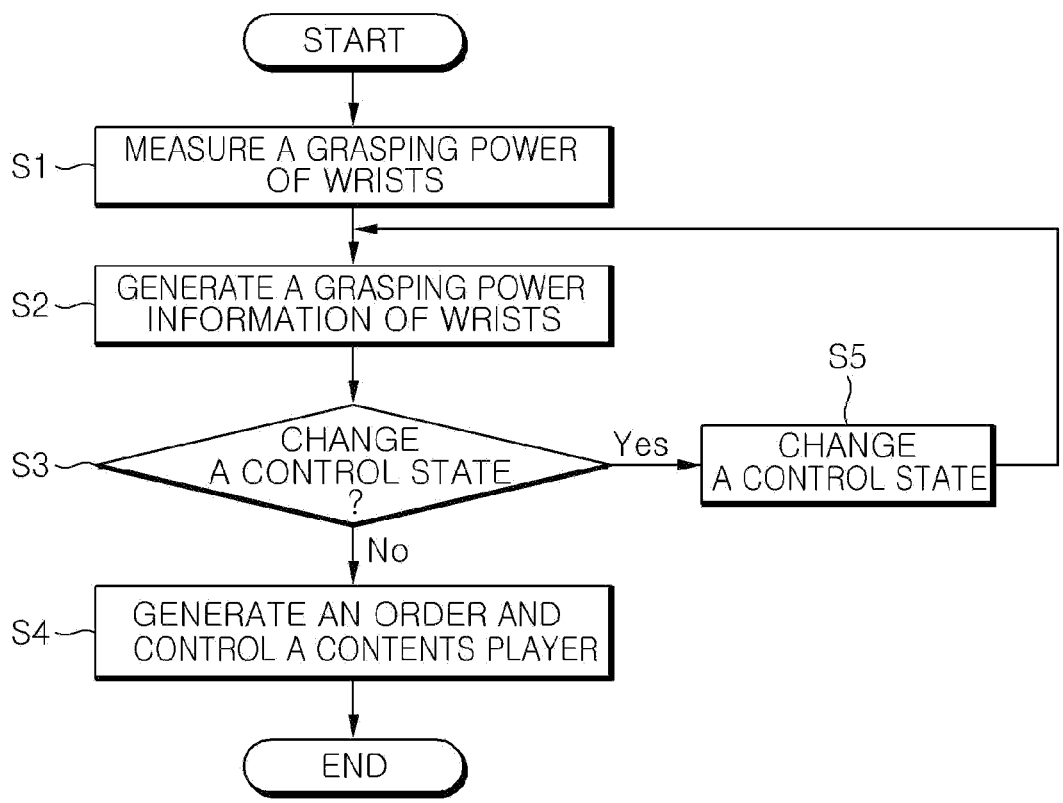
FIG. 6 is a flow chart of a method for controlling a contents player according to the first and the second embodiments of the present invention.

FIG. 6 is a flow chart of a method for controlling a contents player according to the first and the second embodiments of the present invention. Hereinafter, the description about the part that is overlapped with the description as depicted in FIG. 1 to FIG. 6 will be omitted.

The control method of the contents player according to the embodiment of the present invention comprises generating the grasping power information by measuring the shape change of the bundle of tendons of the muscle inside of the wrist by the sensing unit.

Generating the grasping power information may comprise analysing S2 one of whether or not the grasping power of the wrists is over the threshold value, or whether or not the duration time in which the grasping power of wrists exceeds the threshold value exceeds the any value, in addition to the generating step S1 of the grasping power information by measuring the shape change of the bundle of the tendons of the muscle inside of the wrist by the sensing unit.

Managing the control state of the contents player in a response to the grasping power information by the control state managing unit is performed.

The managing the control state comprises determining S3 whether or not the control state managing unit of the contents player in response to the grasping power need to be changed. The change of the control state based on the grasping power information should have priority rather than generating substantially the control order. This is because the control order that is generated by the grasping power information according to the control state can be different.

If the grasping power information that should change the control state is inputted, the changing S5 of the control state is performed, and then analysing S2 of the grasping power information of the wrist is performed. Or, measuring S1 of the grasping power of the wrist again can be again performed.

If the control state is not changed, i.e, the grasping power information that changes the control state resulting from the analysis of the grasping power information is not inputted, generating and transmitting S4 the control order, in which the control order generating unit controls the contents player based on the grasping power information and the control state, are performed. The contents player performs controls controlling up or down of the channel or volume according to the control order generated in the control order generating unit.

FIG. 7 is a block diagram of an example of a method for controlling a contents player according to a second embodiment of the present invention. Hereinafter, the description about the part that is overlapped with the description as depicted in FIG. 1 to FIG. 6 will be omitted.

For the second embodiment of the present invention, there are two sensing units, and each sensing unit consist of the master unit comprising the first sensing unit, the control state managing unit, and the control order generating unit, and the slave unit comprising the second sensing unit and the communication device.

Referring to FIG. 7, the driving state related to the control of the contents player is distinguished, and the generation of the control order according to the driving state and the conversion of the driving state are determined according to the grasping power information of the wrist of the master unit of the slave unit. The driving state according to the description from FIG. 7 means each state in which the controller of the contents player is driven based on the control state as depicted in FIG. 1 to FIG. 6.

Firstly, when a power is supplied to the contents player or the controller, it is converted to S701 state. In S701 state, when the power is supplied to the slave unit, the communication with the master unit is connected. However, the connection between the contents player and the controller are released.

Hereinafter, the grasping power of the wrist in the master unit exceeds the threshold value, and the duration time exceeding the threshold value is passed for the first time (for example, 1 sec), S701 state is converted to S702 state.

In S702 state, the communication between the slave unit and the master unit is connected, and the contents player and the controller are connected. In addition, the control possibility state of the contents player is set up as the possible state basically, and the control order state is set up as the volume.

The control order generating unit in S702 state generates the turning up order of the volume, and transmits to the contents player whenever the grasping power of the wrist in the master unit exceeds the threshold value. In response to this, when the grasping power of the wrist in the slave unit exceeds the threshold value, the control order generating unit generates the down order of the volume, and then transmits the down order of the volume.

In S702 state, if the duration time, in which the grasping power in both wrists of the master unit and the slave unit exceed at the same time the threshold value, exceeds the first time, it is converted to the S703 state. If the same case occurs in S703 state, it is again converted to S702 state.

S703 state is converted from the control order state to the channel (or selection of the contents), while others are the same with S702 state. Therefore, the control order generating unit in S703 state generates the turning up order of the channel whenever the grasping power of the wrists in the master unit exceeds the threshold value, and then transmits to the contents player. On the contrary, whenever the grasping power of the wrist in the slave unit exceeds the threshold value, the control order generating unit generates the down order of the channel, and then transmits the down order of the channel.

In S702 and S703 states, if the duration time, in which the grasping power of both wrists in the master unit and the slave unit exceeds at the same time the threshold value, exceeds the second time (for example, 3 secs), the driving state is converted to S704 state. In the same way, S704 state is converted to the S702 state or S703 state. Therefore, in S704 state whether or not a previous state is S702 state or S703 State may be stored in a memory.

S704 state is called a "lock state." The communication between the slave unit and the master unit is connected, and also the communication between the contents player and the controller is connected. The control order is set up as the volume. However, the control possible state of the contents player is set up as the lock state, so that the control order is not transmitted to the contents player, even if the control order is generated by the control order generating unit. In other words, in S704 state, even if the grasping power of the wrists of the master unit or the slave unit exceeds the threshold value, the control of the contents player is impossible.

In S702, S703, and S704, if the duration time, in which the grasping power in both wrist of the master unit and the slave unit exceeds at the same time the threshold value, exceeds the third time (for example, 5 secs), it is again converted to S701, so that the player and the controller are disconnected. In S701 state, if the information, in which the grasping power of the wrists of the master unit between the fixed time (for example 30 secs) is not inputted, the control that automatically stop supplying the power.

It is assured that any way or state for controlling the contents player using the grasping power of the wrist can be used, in addition to the state conversion and the control order as depicted in FIG. 7.

The description of the device and the method for controlling the contents player according to the embodiments of the present invention should be only used for describing the application, and it is not limited to the claims. In addition, the equivalent invention which is within the right scope similar with the present invention and performs the same function with the present invention can be included in the right scope of the present invention, besides the embodiments of the present invention.

What is claimed is:

1. An apparatus for controlling a contents player, comprising:
    a sensing unit that measures a change of a shape of a bundle of tendons of an inside muscle of a wrist, and generates a grasping power information, the sensing unit including:

a transmitting unit emitting a light signal on the skin tissue of the wrists; and a receiving unit measuring an intensity of radiation which is an amount of the light signal from the transmitting unit reflected by an inside tissue of the wrist;

a control state managing unit that manages a control state of the contents player in response to the grasping power information, the control state including at least one of a connection state indicating whether the contents player and the apparatus for controlling is connected or not, a control possibility state indicating whether or not the contents player is controllable based on a control order, and a control order state for selecting one between the channel and volume controls; and a control order generating unit that generates the control order controlling the contents player based on the grasping power information and the control state, and transmits the control order, the control order generating unit transmitting the control order only when the control possibility state is in a possible state.

2. The apparatus of claim 1, wherein the sensing unit comprises a first sensing unit of a master unit wrist and a second sensing unit of a slave unit wrist installed on both wrists respectively.

3. The apparatus of claim 2, wherein the control state managing unit converts the control state based on a duration time in which both of a grasping power of the master unit and the slave unit wrists exceeds a critical value at the same time.

4. The apparatus of claim 2, wherein the control order generating unit generates different control order according to a case, in which one of a grasping power of the wrist among the master unit and the slave unit exceeds a threshold value.

5. The apparatus of claim 4, wherein the control order generating unit generates the control order that turns up any one of the channel and volume of the contents player when the grasping power of the wrist of the master unit exceeds the threshold value.

6. The apparatus of claim 4, wherein the control order generating unit generates the control order that turns down any one of the channel and volume of the contents player when the grasping power of the wrist of the slave unit exceeds the threshold value.

7. The apparatus of claim 1, wherein the sensing unit generates the grasping power information only when the grasping power of the wrists exceeds a threshold value.

8. A method for controlling a contents player, comprising:

generating a grasping power information by measuring a change of a bundle shape of tendons of an inside muscle of a wrist by a sensing unit, the generating of the grasping power information generated by:

emitting a light signal on the skin tissue of the wrists by a transmitting unit; and measuring an intensity of radiation which is an amount of the light signal from the transmitting unit reflected by an inside tissue of the wrist by a receiving unit;

managing a control state of the contents player in response to the grasping power information by a control state managing unit, the control state including at least one of a connection state indicating whether the contents player and the apparatus for controlling is connected or not, a control possibility state indicating whether or not the contents player is controllable based on a control order, and a control order state for selecting one between the channel and volume controls; and generating and transmitting the control order that controls the contents player based on the control state and the grasping power information by a control order generating unit, the control order generated and transmitted only when the control possibility state is in a possible state.

9. The method of claim 8, wherein generating the grasping power information is generating the grasping power information of both wrists by a first sensing unit of a master unit wrist and a second sensing unit of a slave unit wrist installed on both wrists, respectively.

10. The method of claim 9, wherein managing the control state is converting the control state based on a duration time in which a grasping power of the wrists of the master unit and the slave unit exceeds a threshold value at the same time.

11. The method of claim 9, wherein generating and transmitting the control order is producing different control order according to a case, in which one of a grasping power of the wrists among the master unit and the slave unit exceeds a threshold value.

12. The method of claim 11, wherein generating and transmitting the control order is generating the control order that allows turning up any one of the channel and volume of the contents player when the grasping power of the wrists of the master unit exceeds the threshold value.

13. The method of claim 11, wherein generating and transmitting the control order is generating the control order that allows turning down any one of the channel and volume of the contents player when the grasping power of the wrists of the slave unit exceeds the threshold value.

14. The method of claim 8, wherein generating the grasping power information is generating the grasping power information only when the grasping power of the wrist exceeds a threshold value.

* * * * *